United States Patent
Zhang et al.

(10) Patent No.: US 9,495,379 B2
(45) Date of Patent: Nov. 15, 2016

(54) LOCALITY AWARE, TWO-LEVEL FINGERPRINT CACHING

(71) Applicant: Symantec Corporation, Mountain View, CA (US)

(72) Inventors: Xianbo Zhang, Plymouth, MN (US); Haibin She, Beijing (CN); Chao Lei, Beijing (CN); Xiaobing Song, Beijing (CN); Shuai Cheng, Beijing (CN)

(73) Assignee: Veritas Technologies LLC, Mountain View, CA (US)

( * ) Notice: Subject to any disclaimer, the term of this patent is extended or adjusted under 35 U.S.C. 154(b) by 689 days.

(21) Appl. No.: 13/646,852

(22) Filed: Oct. 8, 2012

(65) Prior Publication Data

US 2014/0101113 A1    Apr. 10, 2014

(51) Int. Cl.
G06F 17/30 (2006.01)
G06F 11/14 (2006.01)
H04L 29/08 (2006.01)

(52) U.S. Cl.
CPC ..... G06F 17/30156 (2013.01); G06F 11/1453 (2013.01); H04L 67/2847 (2013.01); *G06F 2201/81* (2013.01)

(58) Field of Classification Search
CPC ............. G06F 11/1453; G06F 17/30156; G06F 3/0641; G06F 17/30159; G06F 3/067; G06F 11/1464; G06F 11/1469; G06F 2201/83; G06F 17/30097; H04L 67/2842; H04L 67/2847; H04L 9/3239
See application file for complete search history.

(56) References Cited

U.S. PATENT DOCUMENTS

| | | | |
|---|---|---|---|
| 7,587,398 B1* | 9/2009 | Fredricksen et al. | |
| 7,676,503 B2 | 3/2010 | Van Ingen et al. | 714/15 |
| 8,166,261 B1 | 4/2012 | Cremelie et al. | 711/161 |
| 8,214,428 B1* | 7/2012 | Christiaens | 709/203 |
| 2009/0217091 A1 | 8/2009 | Miyamoto et al. | 719/19 |
| 2010/0223441 A1* | 9/2010 | Lillibridge et al. | 711/165 |
| 2010/0250858 A1 | 9/2010 | Cremelie et al. | 711/136 |
| 2010/0312752 A1 | 12/2010 | Zeis et al. | 707/640 |
| 2012/0173558 A1* | 7/2012 | Sorenson, III | G06F 17/30345 707/758 |
| 2012/0191669 A1* | 7/2012 | Kennedy | G06F 11/1453 707/692 |
| 2012/0209814 A1 | 8/2012 | Zhang et al. | 707/654 |
| 2012/0233417 A1* | 9/2012 | Kalach | G06F 11/1469 711/162 |

FOREIGN PATENT DOCUMENTS

WO    WO 03/019412    3/2003    ............. G06F 17/30

* cited by examiner

*Primary Examiner* — Richard Bowen
(74) *Attorney, Agent, or Firm* — Campbell Stephenson LLP

(57) ABSTRACT

The present disclosure provides for implementing a two-level fingerprint caching scheme for a client cache and a server cache. The client cache hit ratio can be improved by pre-populating the client cache with fingerprints that are relevant to the client. Relevant fingerprints include fingerprints used during a recent time period (e.g., fingerprints of segments that are included in the last full backup image and any following incremental backup images created for the client after the last full backup image), and thus are referred to as fingerprints with good temporal locality. Relevant fingerprints also include fingerprints associated with a storage container that has good spatial locality, and thus are referred to as fingerprints with good spatial locality. A pre-set threshold established for the client cache (e.g., threshold Tc) is used to determine whether a storage container (and thus fingerprints associated with the storage container) has good spatial locality.

20 Claims, 12 Drawing Sheets

Backup ID List 120

| | Backup ID 400 | | | | Contents 460 | | | |
|---|---|---|---|---|---|---|---|---|
| | Client Name 410 | Policy Name 420 | Timestamp 430 | Type 440 | Status 450 | Fingerprint 480 | Segment Size 485 | Location 490 |
| Entry 470(1) | Client1 | BUpolicy1 | 01/01/2011, 01:59 | Full | Active | SO1: FP1<br>SO2: FP2<br>SO3: FP3 | size1<br>size2<br>size3 | containerID1<br>containerID2<br>containerID2 |
| Entry 470(2) | Client1 | BUpolicy1 | 01/15/2011, 03:09 | Inc | Active | SO1: FP1<br>SO2: FP2<br>SO4: FP4 | size1<br>size2<br>size4 | containerID1<br>containerID2<br>containerID4 |
| Entry 470(3) | Client1 | BUpolicy2 | 01/30/2011, 02:15 | Full | Active | SO1: FP1<br>SO5: FP5 | size1<br>size5 | containerID1<br>containerID10 |
| Entry 470(N) | ClientN | BUpolicyN | 01/30/2011, 02:15 | Inc | Active | SO101: FP101<br>SO111: FP111 | size100<br>size100 | containerID100<br>containerID100 |

*FIG. 4*

LOCALITY AWARE, TWO-LEVEL FINGERPRINT CACHING

FIELD OF THE INVENTION

This invention relates to data deduplication, and more particularly to caching fingerprints to improve scalability, space reclamation, and restore performance of data deduplication.

DESCRIPTION OF THE RELATED ART

An ever-increasing reliance on information and computing systems, which produce, process, distribute, and maintain data in its various forms, continues to put great demands on techniques for providing data storage and access to that data storage. While data growth is not new, the pace of data growth has become more rapid, the location of data more dispersed, and linkages between data sets more complex. Various organizations that produce and retain large amounts of data must protect and backup such data. However, creating backup images of such data requires a significant amount of network resources. Data deduplication offers network-efficient and storage-optimized data protection for organizations.

BRIEF DESCRIPTION OF THE DRAWINGS

The present invention may be better understood, and its numerous objects, features and advantages made apparent to those skilled in the art by referencing the accompanying drawings.

FIG. 4 is a simplified block diagram illustrating components of an example backup identifier (ID) list, according to one embodiment.

Figure 1:
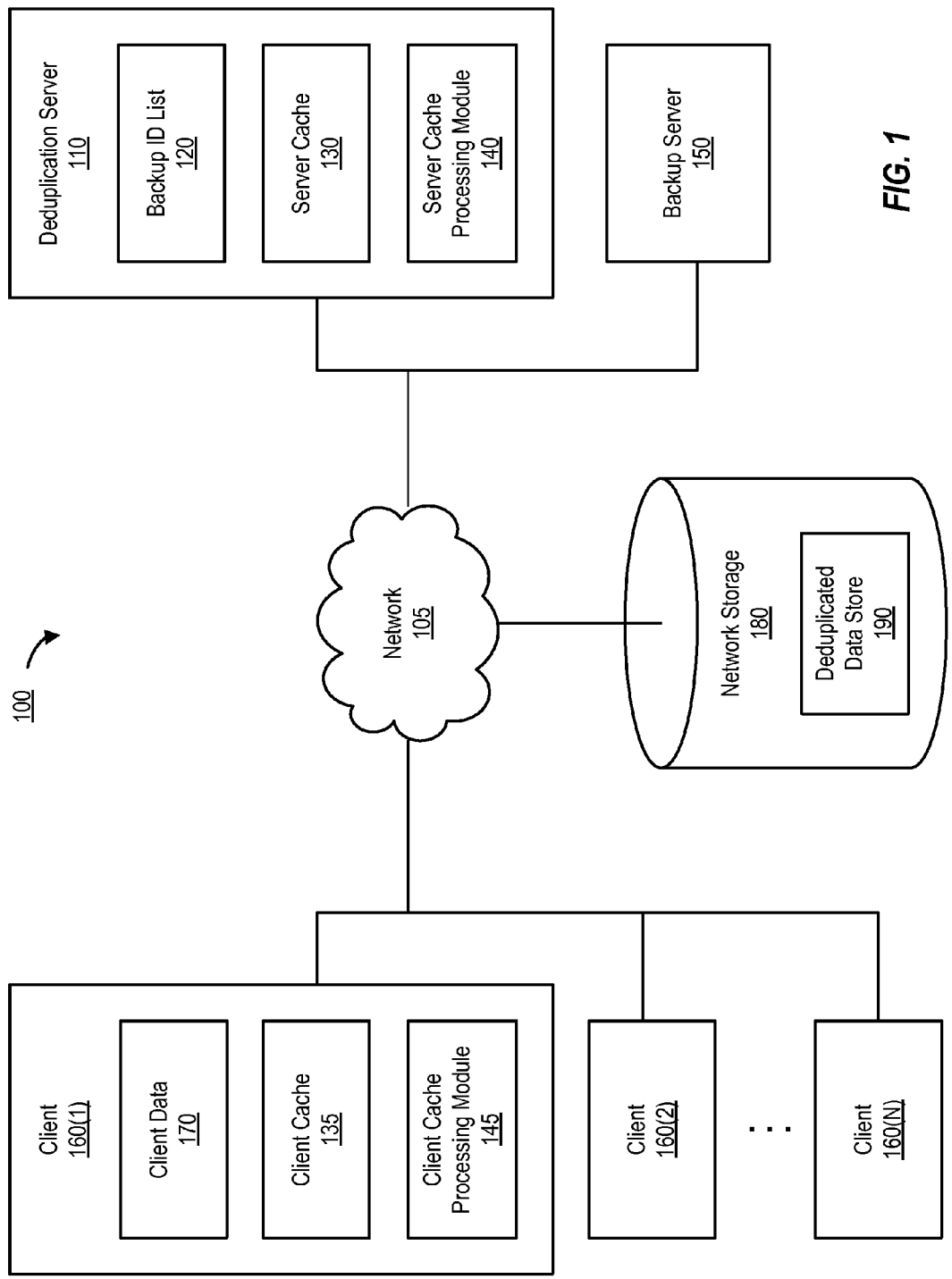
FIG. 1 is a simplified block diagram illustrating components of an example deduplication system in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

Overview

The present disclosure provides for implementing a two-level fingerprint caching scheme to minimize the number of queries and responses exchanged between a client and a deduplication server by performing a portion of the queries locally at a client cache, rather than sending all queries to a server cache on the deduplication server. The cache hit ratio of the client cache can be improved by pre-populating the client cache (e.g., populating the client cache before a deduplication process as part of a backup process) with fingerprints that are relevant to the client, which also reduces the number of queries directed to the server cache. Relevant fingerprints include fingerprints that have been used during a recent time period (e.g., fingerprints of segments that are included in the last full backup image and any following incremental backup images created for the client), and thus are referred to as fingerprints with good temporal locality. Relevant fingerprints also include fingerprints associated with a storage container that has good spatial locality, and thus are referred to as fingerprints with good spatial locality. A pre-set threshold established for the client cache (e.g., threshold Tc) is used to determine whether a storage container (and thus fingerprints associated with the storage container) has good spatial locality.

During a backup process to create a backup image for the client, segments of client data are identified for inclusion in the present backup image. During a deduplication process that is part of the backup process, fingerprints are generated for the client data segments and are compared with the client cache and the server cache to determine if the client data segments are already stored in a deduplicated data store. If a generated fingerprint is present in client cache (e.g., a client cache hit), the segment identified by the generated fingerprint is already stored in the deduplicated data store, and metadata indicating the client cache hit can be recorded. If the generated fingerprint is not present in client cache (e.g., a client cache miss), the server cache is queried for the generated fingerprint. If the generated fingerprint is present in server cache (e.g., a server cache hit), the segment identified by the generated fingerprint is already stored in the deduplicated data store, and metadata indicating the server cache hit can be recorded. If the generated fingerprint is not present in server cache (e.g., a server cache miss), the segment identified by the generated fingerprint should be stored in (e.g., added to) the deduplication data store, and metadata indicating the server cache miss can be recorded. The metadata and generated fingerprints can be used to update the server cache.

Thus, the described two-level fingerprint caching scheme reduces the number of queries and responses exchanged between a client and a deduplication server. This also reduces network resources (e.g., network bandwidth) used to communicate the queries and responses across the network, and reduces processing resources of the deduplication server used to perform client queries (e.g., reduces workload of the deduplication server due to fewer client queries), especially when multiple clients are sending queries to the deduplication server. Further, reducing the number of queries and responses exchanged also reduces the time required to complete a deduplication process, thus reducing the processing resources of the client used to perform the backup process that includes the deduplication process.

Additionally, the temporal locality and spatial locality of fingerprints stored in the server cache can be improved, which can also improve the temporal locality and spatial locality (and thus the cache hit ratio) of the client cache. Rather than store a fingerprint for every data segment stored in deduplicated data store, the server cache can selectively cache fingerprints that have good spatial locality (e.g., fingerprints associate with storage containers that have good spatial locality). A pre-set threshold established for the server cache (e.g., threshold Ts) is used to determine whether a storage container (and thus fingerprints associated with the storage container) has good spatial locality.

Fingerprints associated with a storage container that has poor spatial locality are removed from the server cache. Subsequently, when a fingerprint that is no longer stored in the server cache is encountered during a deduplication process (e.g., as part of a backup process), a server cache miss is reported. As a result of the miss, the fingerprint is added to the server cache and the segment corresponding to the (previously removed) fingerprint is added to deduplicated data store in a new storage container with other recently-added segments, which are likely candidates to be reused as part of a present backup image for client data that has not changed since a previous backup image. In other words, removing a fingerprint with poor spatial locality triggers consolidation of the corresponding segment with other segments in a new storage container with better spatial locality. Thus, spatial locality of the fingerprint is improved (e.g., the fingerprint is now associated with a storage container having better spatial locality), and temporal locality of the fingerprint is also improved (e.g., the fingerprint of a segment that was included in an older backup image is now a fingerprint of a segment that is included in a recent backup image).

When a fingerprint is removed from the server cache, the segment identified by the fingerprint is not removed from the deduplicated data store since the segment is still referenced by a backup image (e.g., a reference to the segment is included in an entry of a backup identifier (ID) list, further discussed below). Thus, in the short term, the described scheme to improve temporal and spatial locality of fingerprints in a server cache also increases the chance of storing duplicate segments in the deduplicated data store (e.g., a same segment is stored twice, as part of an older backup image and as part of a present backup image). However, as older backup images expire, the segments included in such older backup images are no longer referenced by any backup image stored in the deduplicated data store, and thus are removed from deduplicated data store during a garbage collection process. Thus, in the long term, duplicate segments are eliminated due to expiration of older duplicate segments.

The described scheme also has the advantage of being scalable as the server cache grows. If the server cache were to maintain a fingerprint entry for every segment in the deduplicated data store, the server cache would become unwieldy as the number of segments grew, and thus would take an increasing amount of time to perform client queries. By removing fingerprints with poor spatial locality, the server cache is cleared of fingerprints that are not beneficial to keep in the server cache for the purpose of data deduplication (e.g., a fingerprint of a segment that is referenced in one backup image and is not referenced again in future backup images), which helps minimize the size of the server cache and improves server cache performance (e.g., reduces the time required to complete a server cache query or lookup by reducing the total number of entries to search). Further, by removing fingerprints with poor spatial locality, the described scheme encourages backup images to use fingerprints with better spatial locality, and thus provides a more predictable deduplication rate, especially in a long running system.

Finally, improved spatial locality also improves restoration performance. Since the described scheme improves spatial locality (e.g., segments are consolidated into fewer storage containers), restoring a backup image from segments stored in a few consolidated storage containers takes less time, as compared to restoring a backup image from segments scattered across numerous storage containers. Improved spatial locality also improves storage reclamation of whole storage containers. A storage container can be more easily reclaimed since the segments (previously) held by the storage container have been written to new storage containers to improve spatial locality, and thus results in the (old) storage container no longer holding any segment referenced by any existing backup image.

Example Embodiments

FIG. 1 is a simplified block diagram illustrating components of an example deduplication system 100 in which the present disclosure can be implemented. Deduplication system 100 includes a network 105 that communicatively couples a deduplication server 110, one or more client systems 160(1)-(N), and network storage 180. Each component is discussed in further detail below.

One or more client systems 160(1)-(N), also referred to herein as client devices 160 and/or clients 160, can be implemented using, for example, a desktop computer, a laptop computer, a workstation, a server, or the like. An example of such computing devices is described subsequently, in connection with FIG. 10. One or more clients 160(1)-(N) can be configured to communicate with deduplication server 110 via network 105. An example of network 105, which can be used by clients 160(1)-(N) to access deduplication server 110, is a local area network (LAN) utilizing Ethernet, IEEE 802.11x, or some other communications protocol. While FIG. 1 illustrates client system 160(1) including client data 170, each client system can store different client data 170 in storage local to the client system.

Client data 170 can include various data that is generated and/or consumed by applications employed by a user of client system 160(1). Client data 170 can also include executable files, such as those used to implement applications and operating systems, as well as files that are used or generated by such executable files. Client data 170 can include files generated by user applications (e.g., word processing programs, email programs, graphics programs, a database application, or the like) executing on client 160(1). Some of client data 170 may also be transferred to deduplication server 110 via a network 105 for inclusion in deduplicated data store 190 (e.g., stored as part of a backup image in the deduplicated data store). Each client 160 can send different client data 170 to deduplication server 110.

Client 160 includes a client cache 135. Client cache 135 is a cache, buffer, or other storage area in memory (e.g., CPU memory, RAM, Solid State Drive) that stores data. Deduplication server 110 includes a server cache 130, which is also a cache, buffer, or other storage area in memory. Caches are beneficial due to their data access speed, as opposed to storage on disk (e.g., hard disk drives, floppy disk drives, optical disks), where disk access is comparatively slower than cache access due to disk overhead such as latency and seek time. Data (such as fingerprints and associated data used during a deduplication process, further discussed below) remains in client cache 135 and server cache 130 until the cache is cleared, thus providing both a short term (e.g., temporary) and long term (e.g., months) storage solution. The data stored in a cache can also be written to a backup storage area on disk, to prevent cache data loss in the event of power loss to the cache. Alternatively, a cache can be implemented on disk, thus providing a permanent storage solution, but would result in slower disk access and cache performance.

Backup server 150 is also coupled to network 105. Backup server 150 can include one or more nodes (e.g., processors, CPU cores, physical servers) configured to perform a variety of tasks related to management and implementation of backup services for deduplication system 100, such as performing a full or partial backup of a client system 160. In the system illustrated in FIG. 1, backup server 150 is further configured to communicate with deduplication server 110 for purposes of storing backup images of client systems 160(1)-(N) in resources controlled by deduplication server 110 (e.g., network storage 180). Such communication can be via network 105 or via a direct link between backup server 150 and deduplication server 110.

Backup services can be implemented in deduplication system 100 as a client-server application (not shown), with a server component (e.g., residing on backup server 150) and a client component (e.g., residing on client 160) of the client-server application. A server component can be configured to communicate with a client component during a backup process. Certain functions of the backup services can be performed by the client and server components, where the functions may be divided between the two components, or may be performed completely by one component or the other, depending on the implementation of the backup application. For example, backup server 150 can be configured to perform tasks that include communicating with clients 160 to initiate backup tasks on the clients, maintaining databases related to files and other information backed up from file systems associated with the clients, and managing or tracking resources storing backups of clients 160.

Deduplication server 110 is also coupled to network 105 and can be configured to perform a variety of tasks related to management and implementation of deduplication services for the system illustrated in FIG. 1. Deduplication server 110 can include one or more nodes (e.g., processors, CPU cores, physical servers) configured to perform a variety of tasks related to deduplication services. For example, deduplication server 110 can provide deduplication services for eliminating duplicated data content in a backup context.

Deduplication services help reduce an amount of storage needed to store backups of enterprise data (e.g., client data) by providing a mechanism for storing a piece of information only once. Thus, in a backup context, if a piece of information (e.g., a data item) is stored in multiple locations within an enterprise (e.g., on multiple client systems 160), that piece of information can be stored once in a deduplicated backup storage area, such as deduplicated data store 190. Also, if the piece of information does not change between a first point in time (e.g., a first backup image or a first version of a file) and a second point in time (e.g., a second backup image or a second version of a file), then that piece of information need not be stored during a second backup process, as long as that piece of information continues to be stored in the deduplicated backup storage area. Data deduplication can also be employed outside of the backup context, thereby reducing the amount of active storage occupied by duplicate files or data.

Deduplication services can be implemented in the deduplication system as a client-server application (not shown), with a server component (e.g., residing on deduplication server 110) and a client component (e.g., residing on client 160) of the client-server application. Certain functions of the deduplication services can be performed by the client and server components, where the functions may be divided between the two components, or may be performed completely by one component or the other, depending on the implementation of the backup application.

In order to perform data deduplication, a deduplication system needs to be able to identify redundant copies of the same data. One way that can provide a reasonable likelihood of finding duplicated instances of data is to divide file data into consistently-sized segments, which are analyzed for duplication in the deduplicated data store. Thus, if only a portion of a large file is modified, then only the segment of data corresponding to that portion of the file need be stored in deduplicated data store 190. The remainder of the file segments need not be stored again in deduplicated data store 190. In one embodiment, a backup image file can be divided into a plurality of fixed-size segments. In another embodiment, a backup image file can be divided into a plurality of variable-sized segments.

Deduplicated data can be stored in deduplicated data store 190, which is configured on network storage 180. Network storage 180 is also coupled to network 105. Deduplicated data store 190 can be configured as single instance storage (or near-single instance storage). In single instance storage, only a single instance of a piece of data is stored. A common use of single instance storage is the maintenance of data backups for servers and other computing clients in a network. A single instance of information duplicated in deduplication system 100 can be stored in the single instance storage area.

Client 160 and deduplication server 110 can be configured to communicate with each other (e.g., via client and server components) during a deduplication process, which can occur as part of a backup process. For example, during a deduplication process for storing client data 170 (e.g., a file such as a backup image) in deduplicated data store 190, client 160 can be configured to communicate with deduplication server 110 to determine which segments of client data 170 are already stored in deduplicated data store 190. Rather than compare a segment itself to each segment stored in deduplicated data store 190 (which can be enormously time- and processing-prohibitive), identifiers of segments, or fingerprints, can be compared to determine whether a given segment is already stored in deduplicated data store 190.

Deduplication server 110 maintains a database, also referred to as a central index (discussed in further detail below with reference to FIG. 3A), that contains fingerprints corresponding to the segments stored in deduplicated data store 190. Client 160 can generate fingerprints for the segments of client data 170 and can compare the generated fingerprints with the fingerprints stored in the central index to determine if the segments of client data 170 are already stored in deduplicated data store 190. However, client 160 would need to send numerous queries to deduplication server 110 in order to compare the generated fingerprints with the central index, and would also need to wait for the responses from deduplication server 110. Such numerous queries and responses can greatly increase wait time during the deduplication process and thus delay completion of the backup process (especially if the deduplication server has multiple client queries to perform for a number of clients), and can greatly increase network costs of the backup process (e.g., increased network bandwidth, as well as increased server processing resources required for the backup process).

The present disclosure provides for implementing a two-level fingerprint caching scheme to minimize the number of queries and responses exchanged between a client and a deduplication server by performing a portion of the queries locally at a client cache. Server cache 130 can be configured to store the central index, which is further discussed below with reference to FIG. 3A. Client cache 135 can be configured to store relevant central index entries (also referred to as fingerprint entries) that are fetched or retrieved from the central index, which is further discussed below with reference to FIG. 3B. Client cache 135 is pre-populated with the relevant central index entries (which contain relevant fingerprints) before a deduplication process (as part of a backup process) is performed to create a present backup image for client 160, which is further discussed below with reference to FIG. 5. The two-level fingerprint caching scheme can be implemented using a server cache processing module 140 (which is further discussed below with reference to FIG. 2A) and a client cache processing module 145 (which is further discussed below with reference to FIG. 2B).

In response to a request from client cache processing module 145, server cache processing module 140 is configured to identify relevant fingerprint entries, as further discussed below with reference to FIG. 8A. Server cache processing module 140 uses a backup identifier (ID) list 120 (further discussed below with reference to FIG. 4) to identify the previous backup images (e.g., full backup images and incremental backup images) that have been created for client 160 (and thus are relevant to client 160), as well as the segments included in each backup image. Server cache processing module 140 is also configured to retrieve a subset of fingerprint entries from the central index that correspond to the segments included in the previous backup images of the client, and to communicate the subset of fingerprint entries to client cache processing module 145.

Client cache processing module 145 is configured to perform client cache pre-population using the relevant fingerprint entries (also referred to as the subset of fingerprint entries) received from server cache processing module 140, before a deduplication process (as part of a backup process) is performed. In one embodiment, all relevant fingerprint entries received from server cache processing module 140 are used to pre-populate client cache 135. In another embodiment, a portion of the relevant fingerprints are used to pre-populate client cache 135. Client cache pre-population is further discussed below with reference to FIG. 6.

During a deduplication process that is part of the backup process, fingerprints are generated for the client data 170 (e.g., generated by a backup process component). During the deduplication process, client cache processing module 145 is configured to query client cache 135 to check if the generated fingerprints of client data 170 are present in client cache 135 (which is further discussed below in reference to FIG. 7). Client cache processing module 145 is also configured to query server cache 130 (via server cache processing module 140) for any generated fingerprints that were not found in client cache 135. A generated fingerprint that is present in either client cache 135 or server cache 130 indicates that the corresponding data segment identified by the generated fingerprint is already stored in deduplicated data store 190. A generated fingerprint that is not present in client cache 135 and server cache 130 indicates that the corresponding data segment identified by the generated fingerprint should be stored in (e.g., added to) deduplicated data store 190.

Client cache processing module 145 is also configured to communicate metadata about generated fingerprints (e.g., whether the generated fingerprints are present in the client cache and/or server cache) to server cache processing module 140, as well as generated fingerprints themselves, to server cache processing module 140. Server cache processing module 140 is configured to use the metadata and fingerprints to update the central index, which is further discussed below with reference to FIG. 8B. Server cache processing module 140 is also configured to perform periodic maintenance on server cache 130 to improve locality of the fingerprints in server cache 130 (and thus improve locality of client cache 135), such as removing fingerprint entries with poor locality from the central index stored in server cache 130, which is further discussed below with reference to FIG. 9.

Network storage 180 can be implemented as network attached storage (NAS), file servers, storage filers, and/or network shares. Network storage 180 can be implemented as a single storage device or as a collection of storage devices. Network storage 180 can also be implemented as a storage area network (SAN), which couples remote storage devices to a server (e.g., a storage server), such that the remote storage devices appear as locally-attached storage devices to the server's operating system (OS), for example. Network storage 180 can be directly attached to deduplication server 160 or can be coupled to deduplication server 160 via network 105. Network storage 180 can include a data volume or other storage construct.

In light of the present disclosure, it will be appreciated that network storage 180 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives, removable storage in a robot or standalone drive, and the like. Alternatively, it will also be appreciated that, in light of the present disclosure, deduplication system 100 and network 105 can include other components such as routers, firewalls and the like that are not germane to the discussion of the present disclosure and will not be discussed further herein. It will also be appreciated that other configurations are possible. For example, a larger number of client systems 110(1)-(N) can be implemented in the deduplication system 100 than the number shown, client systems 110(1)-(N) can be directly coupled to deduplication server 160 and/or network storage 180, and so on.

The letter N is used to indicate a variable number of devices or components. For example, a variable number of clients are implemented in deduplication system 100. Although the letter N is used in describing a variable number of instances of each of these different devices and components, a repeated use of the letter N does not necessarily indicate that each device and component has a same number of N instances implemented in the deduplication system.

Figure 2A:
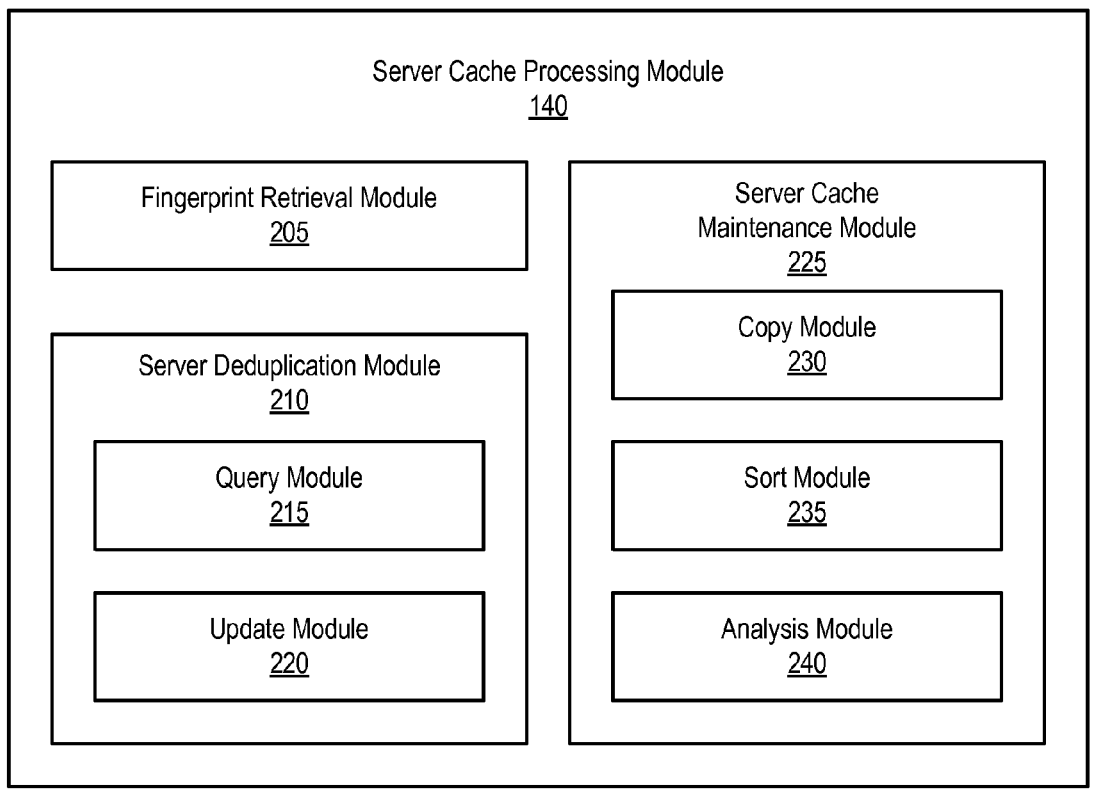
FIG. 2A is a simplified block diagram illustrating components of an example server cache processing module implemented on a deduplication server, according to one embodiment.

FIG. 2A is a simplified block diagram illustrating components of an example server cache processing module 140 implemented on a deduplication server 110. Server cache processing module 140 can include components such as fingerprint retrieval module 205, server deduplication module 210, and server cache maintenance module 225. These components are each discussed in further detail below.

Figure 2B:
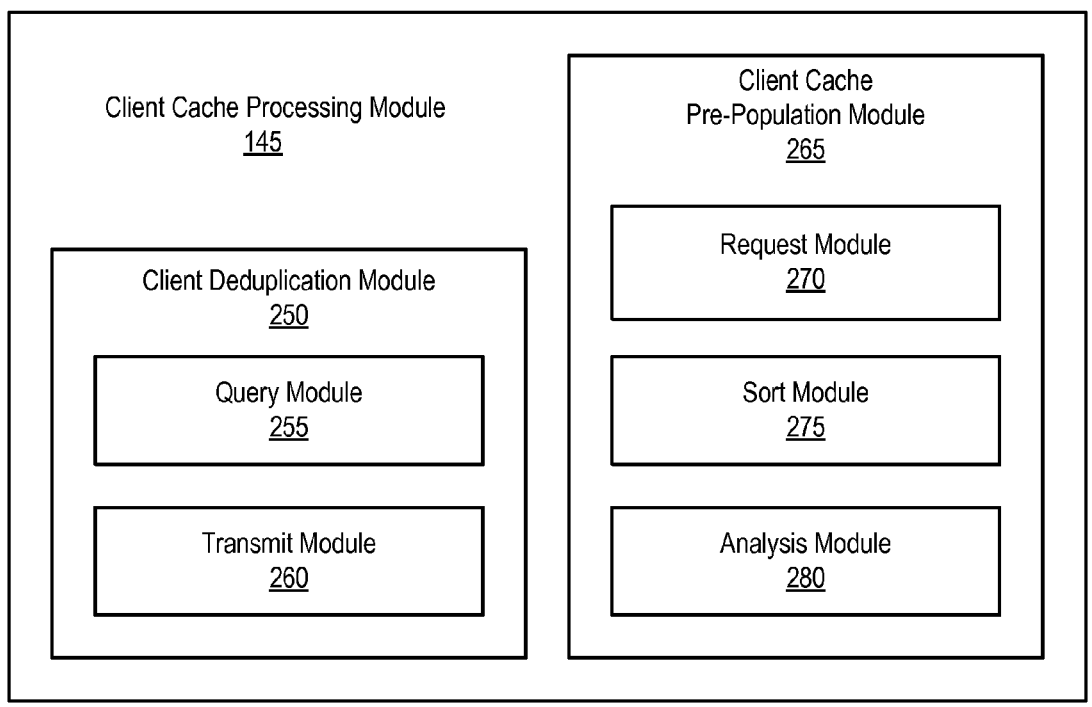
FIG. 2B is a simplified block diagram illustrating components of an example client cache processing module implemented on a client device, according to one embodiment.

FIG. 2B is a simplified block diagram illustrating components of an example client cache processing module 145 implemented on a client device 160. Client cache processing module 145 can include components such as client cache pre-population module 265 and client deduplication module 250. These components are each discussed in further detail below.

Server cache processing module 140 and client cache processing module 145 are configured to communicate with each other. For example, client cache pre-population module 265 (of client cache processing module 145) and fingerprint retrieval module 205 (of server cache processing module 140) are configured to communicate with each other during a client cache pre-population process. Client deduplication module 250 (of client cache processing module 145) and server deduplication module 210 (of server cache processing module 140) are configured to communicate with each other during a deduplication process.

Client cache pre-population module 265 is configured to pre-populate client cache 135 with relevant fingerprints entries before performing a deduplication process of a backup process to create a present backup image for client 160. Client cache pre-population module 265 is triggered in response to initiation of a backup process, and is configured to perform the pre-population before performance of a deduplication process (which is part of the backup process). A backup process can be initiated according to a schedule, or can be initiated by client 160 and/or backup server 150. Client cache pre-population module 265 includes components such as request module 270, sort module 275, and analysis module 280.

Request module 270 is configured to request fingerprints from fingerprint retrieval module 205. In response to the request, fingerprint retrieval module 205 of server cache processing module 140 is configured to retrieve relevant fingerprint entries from the central index and communicate the relevant fingerprint entries to request module 270. A fingerprint retrieval process is described in further detail below with reference to FIG. 8A.

In one embodiment, request module 270 provides the relevant fingerprint entries to client cache 135, where all relevant fingerprint entries are stored in client cache 135. In another embodiment, which is discussed herein, request module 270 provides the relevant fingerprint entries to sort module 275, where a portion of the relevant fingerprint entries are selected and stored in client cache 135. In response to receiving the entries, sort module 275 is configured to sort the entries by location. As further discussed below with reference to FIG. 3A, each fingerprint entry corresponds to a segment stored in deduplicated data store 190. Each fingerprint entry includes an identifier of the location of the corresponding segment, such as a container identifier (ID) of the storage container that includes the segment.

Sort module 275 provides the sorted fingerprint entries (e.g., sorted by container ID) to analysis module 280. In response to receiving the entries, analysis module 280 is configured to identify groups of fingerprint entries that are associated with a given container ID from among the sorted fingerprint entries. Entries associated with particular containers (e.g., containers with good spatial locality) are added to client cache 135, which is described in further detail below with reference to FIG. 6.

As part of the backup process, client 160 (e.g., a backup component or fingerprint generator implemented on client 160) is configured to generate fingerprints for the data segments of client data 170, where each fingerprint uniquely identifies different data segments of client data 170. During the backup process, client deduplication module 250 is configured to compare fingerprints with client cache 135 and with server cache 130 (via server deduplication module 210). Client deduplication module 250 includes components such as (client) query module 255 and transmit module 260. Server duplication module 210 includes components such as (server) query module 215 and update module 220.

Client query module 255 is configured to query client cache 135 for each of the generated fingerprints of the data segments (e.g., query the client cache for one or more generated fingerprints). In response to a client cache hit (e.g., a generated fingerprint is present in the client cache), client query module 255 is configured to record metadata indicating that a data segment identified by the generated fingerprint is already stored in deduplicated data store 190. In response to a client cache miss (e.g., the generated fingerprint is not present in the client cache), client query module 255 is configured to query server cache 130 for the generated fingerprint (e.g., query the central index for the generated fingerprint).

In one embodiment, client query module 255 is configured to generate a query for a single fingerprint and send the query to server query module 215. In another embodiment, client query module 255 is configured to send a list of one or more generated fingerprints that were not present in the client cache to server query module 215. A list of generated fingerprints can be periodically sent to server query module 215 after client query module 255 has queried the client cache for a given number of generated fingerprints (e.g., after every 100 fingerprints), or after all generated fingerprints have been queried from the client cache.

In one embodiment, server query module 215 is configured to query server cache 130 for the generated fingerprint using the query received from client query module 255. In another embodiment, server query module 215 is configured to generate one or more queries for the fingerprints of the list of generated fingerprints received from client query module 255. After querying the server cache, server query module 215 is configured to report the query result(s) to client query module 255, such as whether there was a server cache hit (e.g., the generated fingerprint is present in the central index) or a server cache miss (e.g., the generated fingerprint is not present in the central index).

In response to a server cache hit (which indicates the data segment identified by the generated fingerprint is already stored in deduplicated data store 190), client query module 255 is configured to record metadata indicating that a data segment identified by the generated fingerprint is already stored in deduplicated data store 190. In response to a server cache miss, client query module 255 is configured to record metadata indicating that a data segment identified by the generated fingerprint should be stored in (e.g., added to) deduplicated data store 190.

Once all fingerprints have been queried from server cache 130 and client cache 135, transmit module 260 is configured to send metadata about the generated fingerprints, as well as some or all of the generated fingerprints themselves, to update module 220 to update the central index. Update module 220 is configured to use the metadata and the generated fingerprints to update the central index (which is further discussed below with reference to FIG. 8B). For example, update module 220 is configured to update the central index with new entries that correspond to new/changed segments that are added to deduplicated data store 190. Update module 220 is also configured to update existing central index entries that correspond to segments already stored in deduplicated data store 190.

The metadata and generated fingerprints can also be used to update backup ID list 120 (e.g., performed by a server backup component), such as adding an entry for the present backup image that also includes the fingerprints of the data segments included in the present backup image. As part of the backup process, client 160 (e.g., performed by a client backup component) is also configured to transmit segments of client data 170 to backup server 150 and/or deduplication server 110 for storage in deduplicated data store 190. After the backup process is complete, client cache 135 is cleared.

Server cache maintenance module 225 is configured to perform periodic maintenance of server cache 130, which is further discussed below with reference to FIG. 9. Server cache maintenance module 225 includes components such as copy module 230, sort module 235, and analysis module 240. Periodically (e.g., every 3 months or multiple times a year), server cache maintenance module 225 is configured to remove fingerprint entries from central index that have poor spatial locality. Server cache maintenance module 225 can be triggered according to a maintenance schedule or initiated by client 160.

In one embodiment, copy module 230 is configured to copy all entries of the central index to disk. In another embodiment, copy module 230 is configured to copy a portion of the central index entries, such as entries that are associated with a timestamp older than 3 months. Sort module 235 is configured to sort the entries by location, such as by container ID. Analysis module 240 is configured to identify groups of fingerprint entries that are associated with a given container ID in the sorted entries. Entries associated with particular storage containers (e.g., containers with poor spatial locality) are removed from server cache 130, which is described in further detail below with reference to FIG. 9.

Figure 3A:
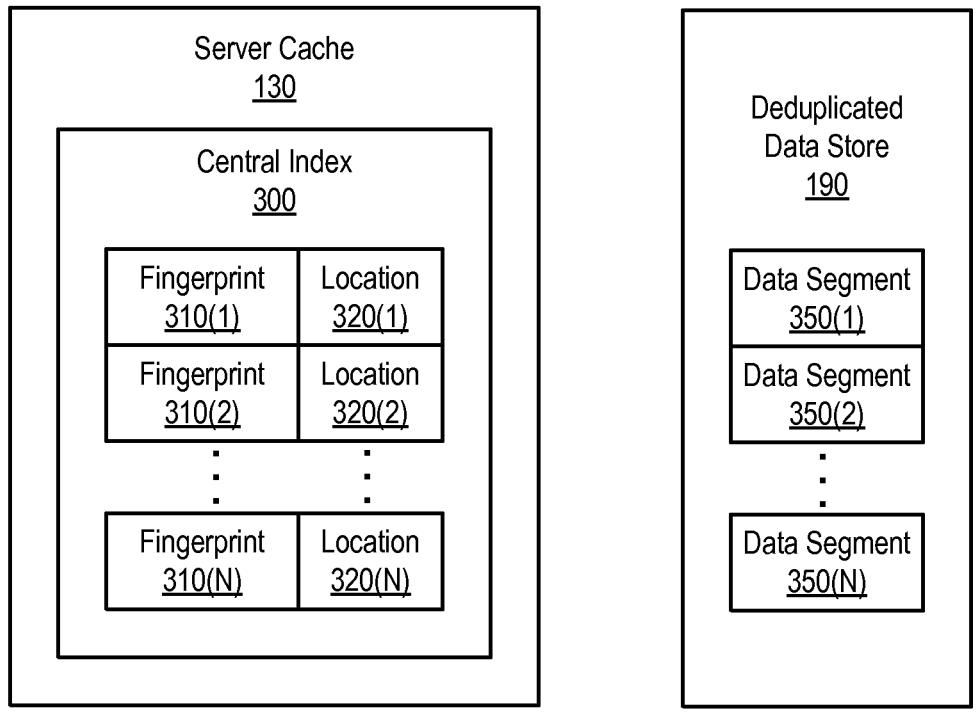
FIG. 3A is a simplified block diagram illustrating components of an example server cache, according to one embodiment.

FIG. 3A is a simplified block diagram illustrating components of an example server cache. Server cache 130 is configured to store a central index 300. Central index 300 includes a set of central index entries (also referred to herein as fingerprint entries), each of which is associated with a data segment stored in deduplicated data store 190. In the embodiment shown, each central index entry includes a fingerprint of a set of fingerprints 310(1)-(N) and a location of a set of locations 320(1)-(N). As shown in FIG. 3A, a fingerprint 310 of a segment and a location 320 (or container ID) of the segment associated with the segment are stored in the segment's corresponding central index entry (or fingerprint entry). Deduplicated data store 190 is also illustrated, and stores data segments 350(1)-(N).

Fingerprint 310 is an identifier of a respective data segment stored in deduplicated data store 190. For example, in the diagram of FIG. 2, fingerprint 310(1) identifies data segment 350(1), fingerprint 310(2) identifies data segment 350(2), and so on. Fingerprint 310 can be a checksum, hash value, or other such value that is calculated based upon data within the data segment (e.g., within a file segment or file). In many embodiments, fingerprints are generated in a manner (e.g., using a cryptographically strong, collision-resistant hash function) that produces the same identifier for identical data segments, while also producing different identifiers for non-identical data segments. Regardless of which particular technique is used to generate fingerprints by a client, the same fingerprint-generation technique is usually implemented throughout deduplication system.

Central index 300 can be keyed to fingerprints 310, where a fingerprint can be used to uniquely identify an entry in central index 300 (which, in turn, corresponds to the data segment identified by the fingerprint). In such an embodiment, central index 300 is sorted by fingerprint (e.g., entries are sorted in increasing order of fingerprint values).

Location 320 is an identifier of a location of where a respective data segment is stored in deduplicated data store 190, such as an identifier of a storage container (e.g., container ID) that includes the respective data segment. For example, location 320(1) indicates the location of data segment 350(1), location 320(2) indicates the location of data segment 350(2), and so on. Each fingerprint 310 of a segment is associated with a location 320 of the segment in the segment's entry.

Segments are grouped in fixed-size storage containers in the order that the segments are received at backup server 150, where each container is written to a location in deduplicated data store 190. Each segment stored in a container is associated with a container identifier (ID) of the container. The container ID of the segment is stored in the segment's corresponding fingerprint entry. Thus, multiple fingerprint entries can be associated with a same container ID.

Each segment (or data segment) has a segment size, or size of the data included in a segment (e.g., data size, such as a number of bytes or kilobytes). In one embodiment, fixed-sized segments can be used, where each segment has a same segment size. In another embodiment, variable-sized segments can be used, where each segment has one of various segment sizes.

Although not shown, a set of reference lists (e.g., one or more reference lists) can also be maintained at deduplication server 110. A reference list is a running set of the references made to a respective data segment, where a reference list includes one or more reference objects. Each reference object stores information about a file (e.g., a backup image) that includes (or makes reference to) the respective data segment, such as an identifier of the file (e.g., a backup image identifier, or backup ID). When a segment is added to deduplicated data store 190, deduplication server 110 can be configured to add an entry to central index 300 that corresponds to the segment. Deduplication server 110 can also be configured to add a reference object to a reference list that corresponds to the segment, such as information about the file that includes the corresponding segment (e.g., a backup identifier (ID) of a backup image that includes the corresponding segment).

If another copy of the data segment that is already stored in deduplicated data store 190 is encountered during a deduplication process (e.g., a fingerprint of a client data segment matches a fingerprint stored in server cache or client cache, as further discussed below), the copy is not stored again. In response to a copy being encountered, deduplication server 110 can be configured to add a new reference list to the set of reference lists that corresponds to the data segment, where a new reference object is added to the new reference list and indicates that another file also includes (or makes reference to) the data segment, such as a backup ID of another backup image that includes the data segment.

When a backup image expires, the reference object or backup ID of the expired backup image is removed from the segment's reference list. When a segment's reference list is empty (e.g., no files reference the segment), the segment's entry is removed from the set of reference lists and the segment is removed from deduplicated data store 190 during a garbage collection process. Thus, a given storage container (stored in deduplicated data store 190) can include active segments that have a corresponding fingerprint entry and expired segments that are waiting for garbage collection (and thus do not have a corresponding fingerprint entry), as well as empty space where expired segments have been removed or deleted.

A storage container has good or poor spatial locality, based on the number of active segments included in the container. Since active segments have a corresponding fingerprint entry in server cache 130, fingerprint entries can be used as proxies for the active segments. As discussed above, each fingerprint entry includes a fingerprint of a corresponding segment, the segment size of the corresponding segment, and a container ID of the storage container that includes the corresponding segment. Thus, each container ID present in the server cache is associated with a group of one or more fingerprints entries. A pre-set threshold can be established by an administrator for the server cache (e.g., threshold Ts) and is used to determine whether a storage container has good spatial locality for the purpose of maintaining fingerprints with good spatial locality in server cache 130 (which is further discussed below with reference to FIG. 9). Since fingerprint entries are proxies for segments, the threshold Ts can be compared with a group of fingerprint entries, which is associated with a same container ID, in order to determine whether the storage container identified by the same container ID has good or poor spatial locality.

In one embodiment, all fingerprint entries in central index 300 are evaluated using the pre-set threshold Ts to determine whether storage containers identified in the central index have good or poor spatial locality. However, such an evaluation can be time- and resource-prohibitive (especially as the number of fingerprints stored in server cache increases). Thus, in another embodiment, a portion of the fingerprint entries (e.g., entries older than 3 months) are evaluated using the pre-set threshold Ts to determine whether the storage containers identified in the portion of fingerprints entries have good or poor spatial locality. In both embodiments, the fingerprint entries (either the entire server cache a portion of the server cache) are copied to a temporary file on disk and sorted by container ID. One or more groups of one or more fingerprint entries can be identified in the temporary file, where each of the fingerprint entries in a group is associated with a same container ID. The threshold Ts is compared with every group of entries in the temporary file to determine whether storage containers corresponding to the groups meet the threshold. If a storage container fails to meet the threshold, the storage container is determined to have poor spatial locality. In response to the determination of poor spatial locality, the group of fingerprint entries associated with the storage container is removed from the server cache.

In one embodiment, a total number of active segments for a storage container can be determined by counting the fingerprint entries in a group of entries associated with the storage container (e.g., entries that include a container ID of the storage container) to result in a total fingerprint entry count for the storage container. If the total fingerprint entry count of a storage container is less than a threshold entry count Ts, the storage container is determined to have poor spatial locality. In other words, a determination is made as to whether the storage container is associated with at least a threshold number of entries Ts, and the storage container is determined to have poor spatial locality if the threshold Ts is not met. A threshold entry count Ts is beneficial if fixed-size segments are used in the deduplication system, where each data segment has a same segment size.

In another embodiment, a total segment size can be calculated for a storage container by adding the segment sizes of the fingerprint entries in the group of entries associated with the storage container (which indicates a total amount of segment data stored in the storage container). If the total segment size of a storage container is less than a threshold segment size Ts, the storage container is determined to have poor spatial locality. In other words, a determination is made as to whether the storage container stores or includes at least a threshold amount of segment data Ts, and the storage container is determined to have poor spatial locality if the threshold Ts is not met. A threshold segment size Ts is beneficial if variable-size segments are used in the deduplication system, where each data segment has one of various segment sizes.

Figure 3B:
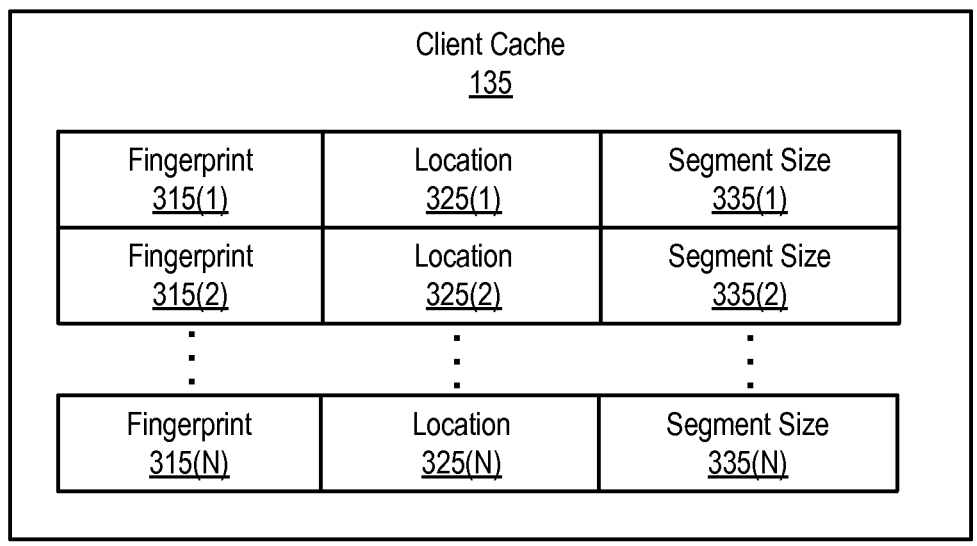
FIG. 3B is a simplified block diagram illustrating components of an example client cache, according to one embodiment.

FIG. 3B is a simplified block diagram illustrating components of an example client cache. Client cache 135 is configured to store a subset of fingerprint entries (or central index entries) retrieved from central index 300, which is stored in server cache 130. In the embodiment shown, each fingerprint entry includes a fingerprint of a set of fingerprints 315(1)-(N), a location of a set of locations 325(1)-(N), and a segment size of a set of segment sizes 335(1)-(N). The subset of fingerprint entries are relevant to the client performing a present backup process, where each of the subset of fingerprint entries correspond to segments included in one or more recent backup images of the client (further discussed below with reference to FIG. 8A). Thus, storing relevant fingerprint entries in client cache 135 improves the likelihood of client cache hits, since the segments corresponding to the relevant fingerprint entries are likely candidates to be reused as part of a present backup image for client data that has not changed since a previous backup image.

In one embodiment, the entire subset of fingerprint entries is stored in client cache 135. In another embodiment, the subset of fingerprint entries are stored in a buffer list or other temporary file, and a portion of the subset of fingerprint entries is selected from the buffer list and cached in client cache 135 (further discussed below with reference to FIG. 6). By selectively caching a portion of the subset of fingerprint entries in the client cache, the likelihood of client cache hits is maintained while also improving client cache performance (e.g., reduce the time required to complete a client cache query or lookup by reducing the total number of cache entries to search). In one embodiment, the portion of the subset of fingerprint entries is selected based on storage containers with good spatial locality.

As discussed above, a storage container has good or poor spatial locality, based on the number of active segments included in the storage container. Fingerprint entries can be used as proxies for corresponding active segments stored in containers, where each fingerprint includes a container ID of a storage container that includes the corresponding active segment. Thus, each container ID present in the subset of fingerprint entries is associated with a group of one or more fingerprint entries. The buffer list that stores the subset of fingerprint entries can be sorted by container ID, and one or more groups of one or more fingerprint entries can be identified in the subset of fingerprint entries, where each of the fingerprint entries in a group is associated with a same container ID. A pre-set threshold can be established by an administrator for the client cache (e.g., threshold Tc) and is used to determine whether a storage container has good spatial locality for the purpose of selectively caching fingerprints with good spatial locality in client cache 135 (which is further discussed below with reference to FIG. 6). Since fingerprint entries are proxies for segments, the threshold Tc can be compared with a group of fingerprint entries, which is associated with a same container ID, in order to determine whether the storage container identified by the same container ID has good or poor spatial locality. In other words, the threshold Tc is compared with every group of entries in the buffer list to determine whether storage containers corresponding to the groups meet the threshold. If a storage container meets the threshold Tc, the storage container is determined to have good spatial locality. In response to the determination of good spatial locality, the group of fingerprint entries associated with the storage container is added to the client cache.

In one embodiment, a total number of active segments for a storage container can be determined by counting the fingerprint entries in the group of entries associated with the storage container (e.g., entries that include a container ID of the storage container) to result in a total fingerprint entry count for the storage container. If the total fingerprint entry count of a storage container is equal to or greater than a threshold entry count Tc, the storage container is determined to have good spatial locality. In other words, a determination is made as to whether the storage container is associated with at least a threshold number of entries Tc, and the storage container is determined to have good spatial locality if the threshold Tc is met. A threshold entry count Tc is beneficial if fixed-size segments are used in the deduplication system, where each data segment has a same segment size.

In another embodiment, a total segment size can be calculated for a storage container by adding the segment sizes of the fingerprint entries in the group of entries associated with the storage container (which indicates a total amount of segment data stored in the storage container). If the total segment size of a storage container is equal to or greater than a threshold segment size Tc, the storage container is determined to have good spatial locality. In other words, a determination is made as to whether the storage container stores or includes at least a threshold amount of segment data Tc, and the storage container is determined to have poor spatial locality if the threshold Tc is not met. A threshold segment size Tc is beneficial if variable-size segments are used in the deduplication system, where each data segment has one of various segment sizes.

FIG. 4 is a simplified block diagram illustrating components of an example backup identifier (ID) list. Backup ID list 120 includes entries 470(1)-(N), where each list entry corresponds to a backup image stored in deduplicated data store 190. Backup ID list 120 stores various metadata about the backup image files stored in deduplicated data store 190 (e.g., file name, file path, file attributes, fingerprints). In the embodiment shown, each list entry includes a backup identifier (ID) 400 of a corresponding backup image stored in deduplicated data store 190. Backup ID 400 is the combination of a client name 410 (e.g., a name of a client performing a backup process to create a present backup image), a policy name 420 (e.g., a name of a backup policy created for the client), and a timestamp 430 of the corresponding backup image (e.g., a time when the backup image is created for the client).

Each list entry also includes type 440 (e.g., a backup image type, such as a full or incremental) and status 450 (e.g., a status of the corresponding backup image, such as active or inactive). Each list entry also includes contents 460, which includes information that identifies the segments included in the corresponding backup image, also referred to as a segment object. In the example embodiment shown, entry 470(1) includes information about a full backup image with active status that includes segments identified by segment objects SO1, SO2, and SO3. Entry 470(2) includes information about an incremental backup image with active status that includes segment objects SO1, SO2, and SO4. The segment objects in contents 460 can each include fingerprint 380 that identifies a segment included in the corresponding backup image (where multiple backup images can include a same segment), as well as a segment size 485 of the segment (or data size of the segment), and a location 490 of the segment (such as container ID of a container that includes the segment).

A single backup image can be associated with multiple segments stored throughout deduplicated data store 190, and multiple backup images can be associated with a single segment (e.g., the multiple backup images share the single segment). Thus, backup ID list 120 can provide a mapping of a backup image to the various segments stored in deduplicated data store 190 that compose the backup image.

Figure 5:
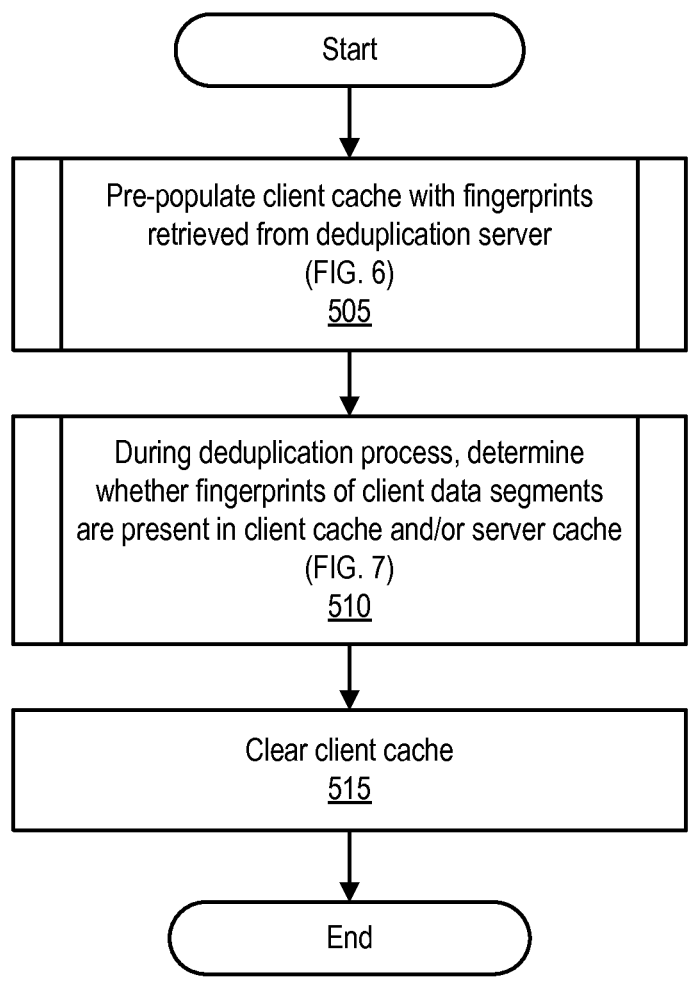
FIG. 5 is a flowchart illustrating an example client process implementing the present disclosure, according to one embodiment.

FIG. 5 is a flowchart illustrating an example client process implementing the present disclosure. The process illustrated in FIG. 5 can be implemented by client cache processing module 145. The process illustrated in FIG. 5 can be triggered in response to initiation of a backup process for creating a present backup image for the client. The process starts at operation 505, where client cache processing module 145 is configured to pre-populate a client cache with fingerprints retrieved from a deduplication server. Operation 505 is discussed in further detail with reference to FIG. 6.

The process continues to operation 510, where client cache processing module 145 is configured to determine whether fingerprints of client data segments are present in a client cache and/or a server cache during a deduplication process of the backup process. In other words, the determining of operation 510 occurs subsequent to the pre-populating of operation 505. Operation 510 is discussed in further detail with reference to FIG. 7. Once the deduplication process and the backup process are complete, the process then continues to operation 515, where client cache processing module 145 clears the client cache. The process then ends.

Figure 6:
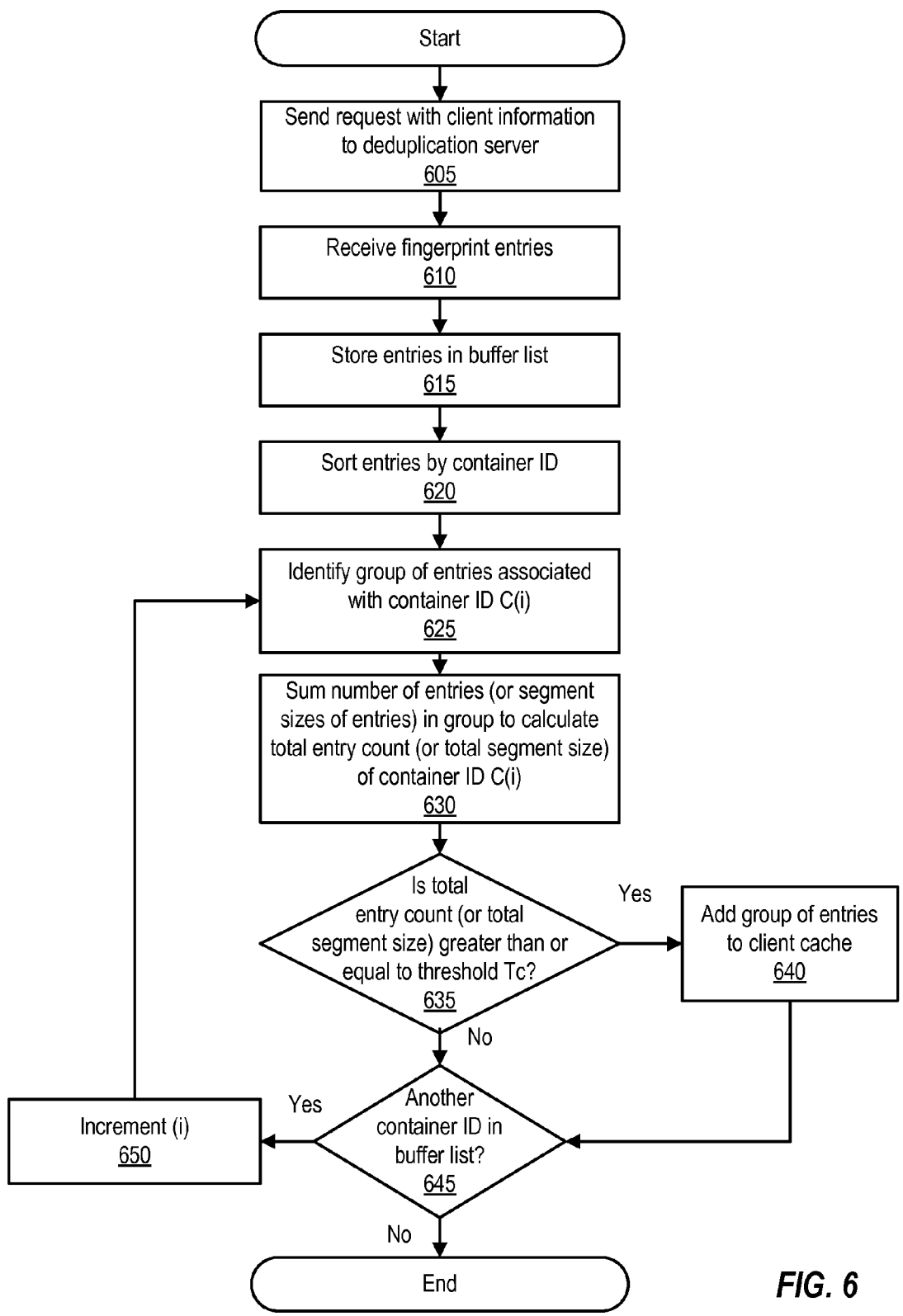
FIG. 6 is a flowchart illustrating an example client cache pre-population process implemented by a client cache processing module, according to one embodiment.

FIG. 6 is a flowchart illustrating an example client cache pre-population process implemented by client cache pre-population module 265 of client cache processing module 145. For example, the process illustrated in FIG. 6 can be implemented cooperatively by request module 270, sort module 275, and analysis module 280.

The process starts at operation 605, where request module 270 sends a request to a deduplication server (e.g., to a server cache processing module implemented on a deduplication server). The request can include information about the client that can be used by the deduplication server to identify and retrieve a subset of fingerprint entries from a central index. The process continues to operation 610, where request module 270 receives the subset of fingerprint entries from the deduplication server. The process continues to operation 615, where request module 270 stores the subset of fingerprint entries as a list in a buffer or other temporary storage area in memory.

The process continues to operation 620, where sort module 275 sorts the fingerprint entries in the buffer list by container ID, in order to group entries of the buffer list into groups of one or more fingerprint entries associated with a given container ID. The process then continues to operation 625, where analysis module 280 identifies a group of fingerprint entries that are associated with a given container ID C(i). Operation 625 begins a sequence of operations that can be repeated for each group of entries associated with a different container ID. A present iteration of the sequence is indicated by the letter i, which can be initialized to one (thus starting the sequence with a group of entries associated with a first container ID) when analysis module 280 begins analyzing the buffer list. At the end of the sequence, the letter i is incremented (e.g., operation 650), indicating that another group of entries associated with a next container ID can be analyzed (if there is a next container ID in the buffer list).

The process continues to operation 630, where analysis module 280 sums the number of entries in the group to calculate a total entry count of container ID C(i). The process continues to operation 635, where analysis module 280 determines whether the total entry count is greater than or equal to a threshold entry count Tc for the client cache (e.g., threshold Tc). A pre-set threshold entry count Tc can be defined by an administrator (e.g., based on a number beneficial for the needs of the deduplication system) and can be used to determine whether a container has good spatial locality. A threshold value used for the client cache (e.g., threshold Tc) is not necessarily the same threshold value used for the server cache (e.g., threshold Ts). If the total entry count is greater than or equal to the threshold entry count Tc, the process continues to operation 640, where analysis module 280 adds the group of entries associated with the container ID C(i) to the client cache, and then to operation 645, where analysis module determines if another container ID is included in the buffer list.

Returning to operation 635, if the total entry count is not greater than or equal to (e.g., is less than) the threshold entry count Tc, the process continues to operation 645, where analysis module determines if another container ID is included in the buffer list. If another container ID is included in the buffer list, the process continues to operation 650, where the letter i is incremented, and the process returns to operation 625 to analyze the group of entries associated with the next container ID. Returning to operation 645, if there is not another container ID in the buffer list, the process ends.

In another embodiment of operation 630, analysis module 280 sums the segment sizes of each entry in the group to calculate a total segment size of container ID C(i). In another embodiment of operation 635, analysis module 280 determines whether the total segment size is greater than or equal to a threshold segment size Tc. If the total segment size is greater than or equal to the threshold segment size Tc, the process continues to operation 640, where analysis module 280 adds the group of entries associated with the container ID C(i) to the client cache. If the total segment size is not greater than or equal to (e.g., is less than) the threshold segment size Tc, the process continues to operation 645.

Figure 7:
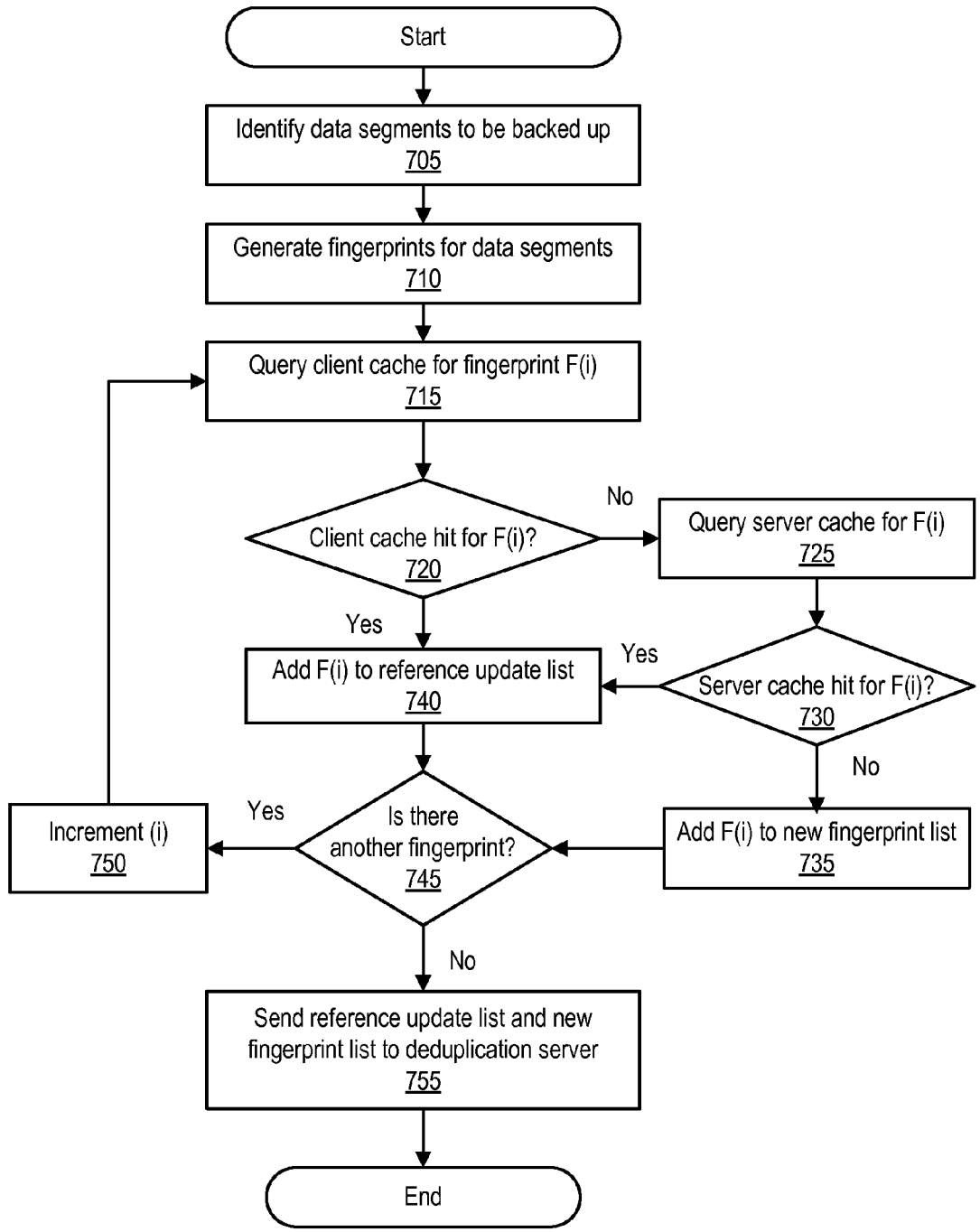
FIG. 7 is a flowchart illustrating an example fingerprint query process implemented by a client cache processing module, according to one embodiment.

FIG. 7 is a flowchart illustrating an example fingerprint query process implemented by a client deduplication module 250 of client cache processing module 145. For example, the process illustrated in FIG. 7 can be implemented cooperatively by query module 255 and transmit module 260.

The process starts at operation 705, where a client identifies data segments of client data that are to be backed up during a backup process. Operation 705 can be performed by a client backup component implemented on the client. The process continues to operation 710, where the client generates fingerprints for the data segments. Operation 710 can also be performed by a client backup component implemented on the client. Operations 705 and 710 of FIG. 7 are included to illustrate the initial operations of a backup process to create a present backup image. Operations 715 through 755 illustrate operations of a deduplication process that is included in the backup process.

The process continues to operation 715, where client query module 255 queries the client cache for a fingerprint F(i), which can involve comparing fingerprint F(i) with other fingerprints stored in the client cache. Operation 255 begins a sequence of operations that can be repeated for each generated fingerprint of the data segments to be backed up. A present iteration of the sequence is indicated by the letter i, which can be initialized to one (thus starting the sequence with a first generated fingerprint) when query module 255 begins querying the client cache for the generated fingerprints. At the end of the sequence, the letter i is incremented (e.g., operation 750), indicating that the client cache is queried for a next fingerprint (if there is a next generated fingerprint).

The process continues to operation 720, where client query module 255 determines if the query results in a client cache hit for fingerprint F(i). If the query did not hit (e.g., the query resulted in a client cache miss), then fingerprint F(i) is not present in client cache. In response to the client cache miss, the process continues to operation 725, where client query module 255 queries server cache for fingerprint F(i), which can involve comparing fingerprint F(i) with other fingerprints stored in the server cache. Client query module 255 can communicate a query or a list of fingerprints to server query module 215. Server query module 215 can execute the query against the server cache and return the query result to client query module 255. The process then continues to operation 730, where client query module 255 determines if the server cache query results in a server cache hit for fingerprint F(i). If the query did not hit (e.g., the query resulted in a server cache miss), then fingerprint F(i) is not present in the server cache. In response to the server cache miss, the process continues to operation 735, where client query module 255 adds fingerprint F(i) to a new fingerprint list.

Returning to operation 730, if the server cache query results in a server cache hit, the process continues to operation 740, where client query module 255 adds fingerprint F(i) to a reference update list. Similarly, returning to operation 720, if the client cache query results in a client cache hit, then the process continues to operation 740.

After operations 740 and 735, the process continues to operation 745, where client query module 255 determines if there is another generated fingerprint to query. If there is another fingerprint, the letter i is incremented in operation 750 and the process continues to operation 715 to query the client cache for the next generated fingerprint. If there is not another fingerprint, then the reference update list and the new fingerprint list are sent to deduplication server (e.g., to update module 220) by transmit module 260. The process then ends.

Figure 8A:
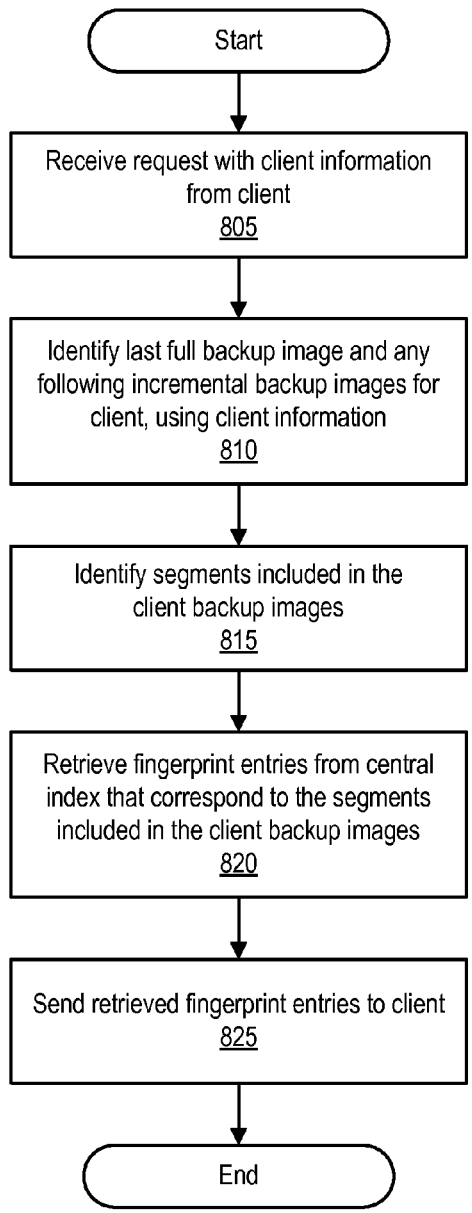
FIG. 8A is a flowchart illustrating an example fingerprint entry retrieval process implemented by a server cache processing module, according to one embodiment.

FIG. 8A is a flowchart illustrating an example fingerprint entry retrieval process implemented by a server cache processing module. For example, the process illustrated in FIG. 8A can be implemented by fingerprint retrieval module 205 of server cache processing module 140. Fingerprint retrieval module 205 can provide relevant fingerprint entries to a client in response to a request from the client. Selecting the fingerprints of the most recent backup images of a client (e.g., the last full backup image of the client and any incremental backup images of the client created after the last full backup image was created) for inclusion in a client cache improves temporal locality of the fingerprints in the client cache. This selection also improves the likelihood of client cache hits for client data that has not changed since a previous backup image (e.g., fingerprints of segments that are included in a recent backup image of a client are likely candidates to be reused as part of a new/present backup image of the client, and thus are relevant fingerprints), and thus minimizes server cache queries.

The process starts at operation 805, where fingerprint retrieval module 205 receives a request from a client performing a backup process. The request can include information about the client, such as a client name and backup policy name. The process continues to operation 810, where fingerprint retrieval module 205 uses the client information of the request to identify backup images related to the client in a backup ID list. Fingerprint retrieval module 205 can search the backup ID list for backup IDs that match the client information, and thus identify a last full backup image created for the client, as well as any following incremental backup images created for the client.

The process continues to operation 815, where fingerprint retrieval module 205 identifies segments included in the client backup images. As discussed above, backup ID list provides a mapping of segments included in a respective backup image. For each backup image identified using the client information, fingerprint retrieval module 205 identifies the segments included in the identified backup images. The process continues to operation 820, where fingerprint retrieval module 205 retrieves fingerprint entries from the central index that correspond to the segments included in the identified client backup images. Fingerprint retrieval module 205 also temporarily protects the identified client backup images until the end of the backup process, in order to prevent the data segments and corresponding fingerprint entries of the identified client backup images from being changed or deleted. The process continues to operation 825, where fingerprint retrieval module 205 sends the retrieved fingerprint entries to the client (which are used to prepopulate the client cache), and the process then ends.

Figure 8B:
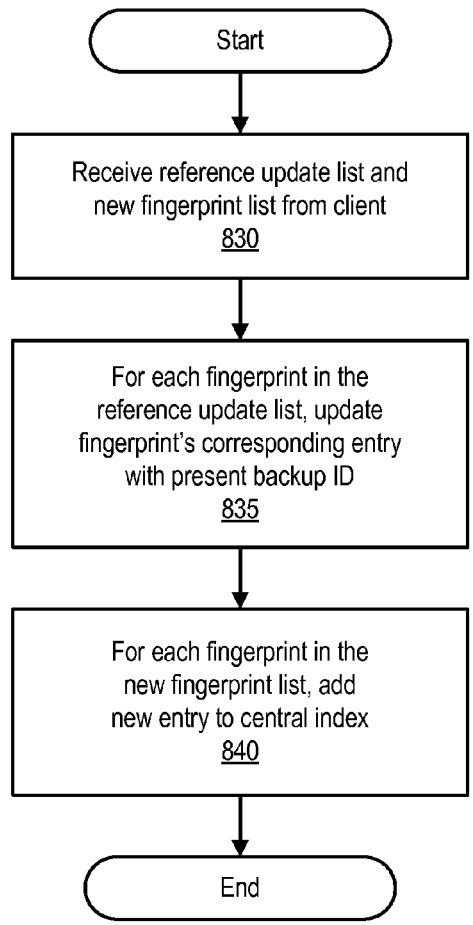
FIG. 8B is a flowchart illustrating an example central index update process implemented by a server cache processing module, according to one embodiment.

FIG. 8B is a flowchart illustrating an example central index update process implemented by a server cache processing module. For example, the process illustrated in FIG. 8B can be implemented by update module 220 of server cache processing module 140. The process starts at operation 830, where update module 220 receives a reference update list and new fingerprint list from the client. The process continues to operation 835, where update module 220 updates existing entries in the central index using the reference update list. For each fingerprint in the reference update list, update module 220 can update the respective fingerprint's corresponding entry by adding a backup ID of the present backup image to the reference list of the corresponding entry, which indicates that the present backup image includes segments that correspond to these particular fingerprints.

The process continues to operation 840, where update module 220 adds new entries to the central index using the new fingerprint list. For each fingerprint in the new fingerprint list, update module 220 can add a new corresponding entry to the central index. Each new entry also includes a backup ID of the present backup image in the reference list, which indicates that the present backup image includes segments that correspond to these particular fingerprints. While operation 840 is illustrated as occurring after operation 835, operations 835 can occur after operation 840. The process then ends.

Figure 9:
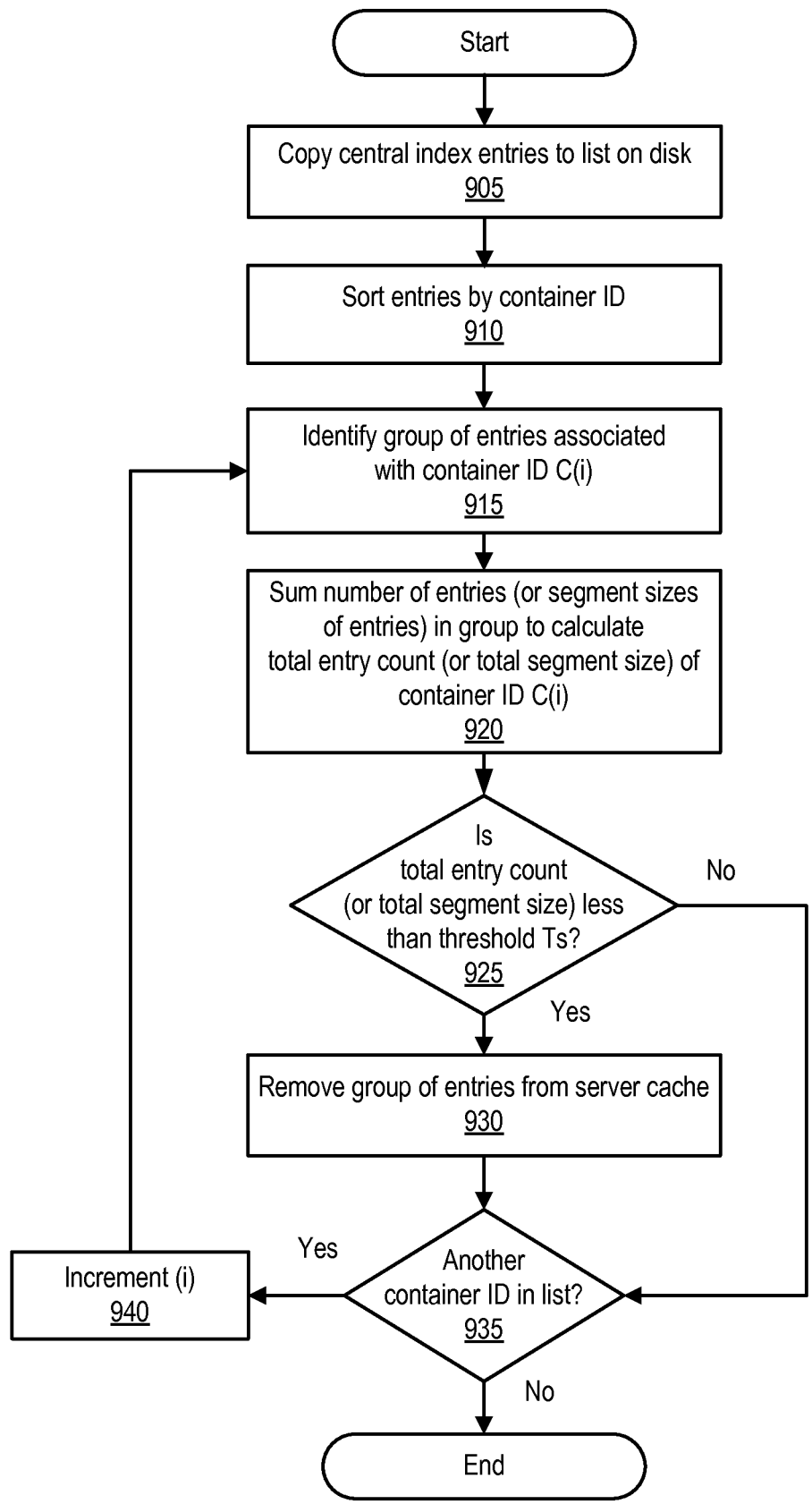
FIG. 9 is a flowchart illustrating an example server cache maintenance process implemented by a server cache processing module, according to one embodiment.

FIG. 9 is a flowchart illustrating an example server cache maintenance process implemented by a server cache maintenance module 225 of server cache processing module 140. For example, the process illustrated in FIG. 9 can be implemented cooperatively by copy module 230, sort module 235, and analysis module 240. The server cache can be maintained to promote better spatial locality and temporal locality of the fingerprints stored in the central index. Rather than continuing to store a fingerprint entry for every segment stored in the deduplicated data store, the server cache can selectively cache entries that have good spatial locality (e.g., fingerprint entries associated with containers that have good spatial locality), using a pre-set threshold Ts to determine whether a container has good spatial locality. The server cache acts as a permanent cache for all added entries and can be maintained indefinitely, with performance of periodic server cache maintenance. Server cache maintenance module 225 is configured to perform such server cache maintenance by removing entries from the server cache/central index that are associated with containers having poor spatial locality. The segments associated with the removed entries are not cleared from the deduplicated data store, however, since the segments are still included in (or referenced by) one or more backup images (and thus the segments are still included in backup ID list for these one or more backup images). These segments can be removed from the deduplicated data store at a later date, such as at the expiration of all backup images that reference a given segment.

The process starts at operation 905, where copy module 230 copies central index entries to a list on the deduplication server's disk. Copy module 230 can copy a portion of the central index entries, such as the entries that are older than a given time period (e.g., 3 months). The process continues to operation 910, where sort module 235 sorts the entries in the list by container ID. The process continues to operation 915, where analysis module 240 identifies a group of entries associated with a given container ID C(i). Operation 915 begins a sequence of operations that can be repeated for each group of entries associated with a different container ID. A present iteration of the sequence is indicated by the letter i, which can be initialized to one (thus starting the sequence with a group of entries associated with a first container ID) when analysis module 240 begins analyzing the list on disk. At the end of the sequence, the letter i is incremented (e.g., operation 940), indicating that another group of entries associated with a next container ID can be analyzed (if there is a next container ID in the list).

The process continues to operation 920, where analysis module 240 sums the number of entries in the group to calculate a total entry count of container ID C(i). The process continues to operation 925, where analysis module 240 determines whether the total entry count is less than a threshold entry count Ts (e.g., threshold Ts). A threshold value used for the client cache (e.g., threshold Tc) is not necessarily the same threshold value used for the server cache (e.g., threshold Ts). If the total entry count is less than a threshold entry count Ts, the process continues to operation 930, where analysis module 240 removes the group of entries associated with the container ID C(i) from the server cache. The process continues to operation 935, where analysis module 240 determines if another container ID is included in the list. Returning to operation 925, if the total entry count is not less than a threshold entry count Ts (e.g., is greater than or equal to the threshold entry count), the group of entries are not removed from the server cache, and the process also continues to operation 935.

Returning to operation 935, if another container ID is included in the list, the process continues to operation 940, where the letter i is incremented, and the process returns to operation 915 to analyze the group of entries associated with the next container ID. If there is not another container ID in the list, the process ends.

In another embodiment of operation 920, analysis module 240 sums the segment sizes of each entry in the group to calculate a total segment size of container ID C(i). In another embodiment of operation 925, analysis module 240 determines whether the total segment size is less than a threshold segment size Ts. If the total segment size is less than the threshold segment size Ts, the process continues to operation 930, where analysis module 240 removes the group of entries associated with the container ID C(i) from the server cache. If the total segment size is not less than (e.g., is greater than or equal to) the threshold segment size Ts, the process continues to operation 935.

Figure 10:
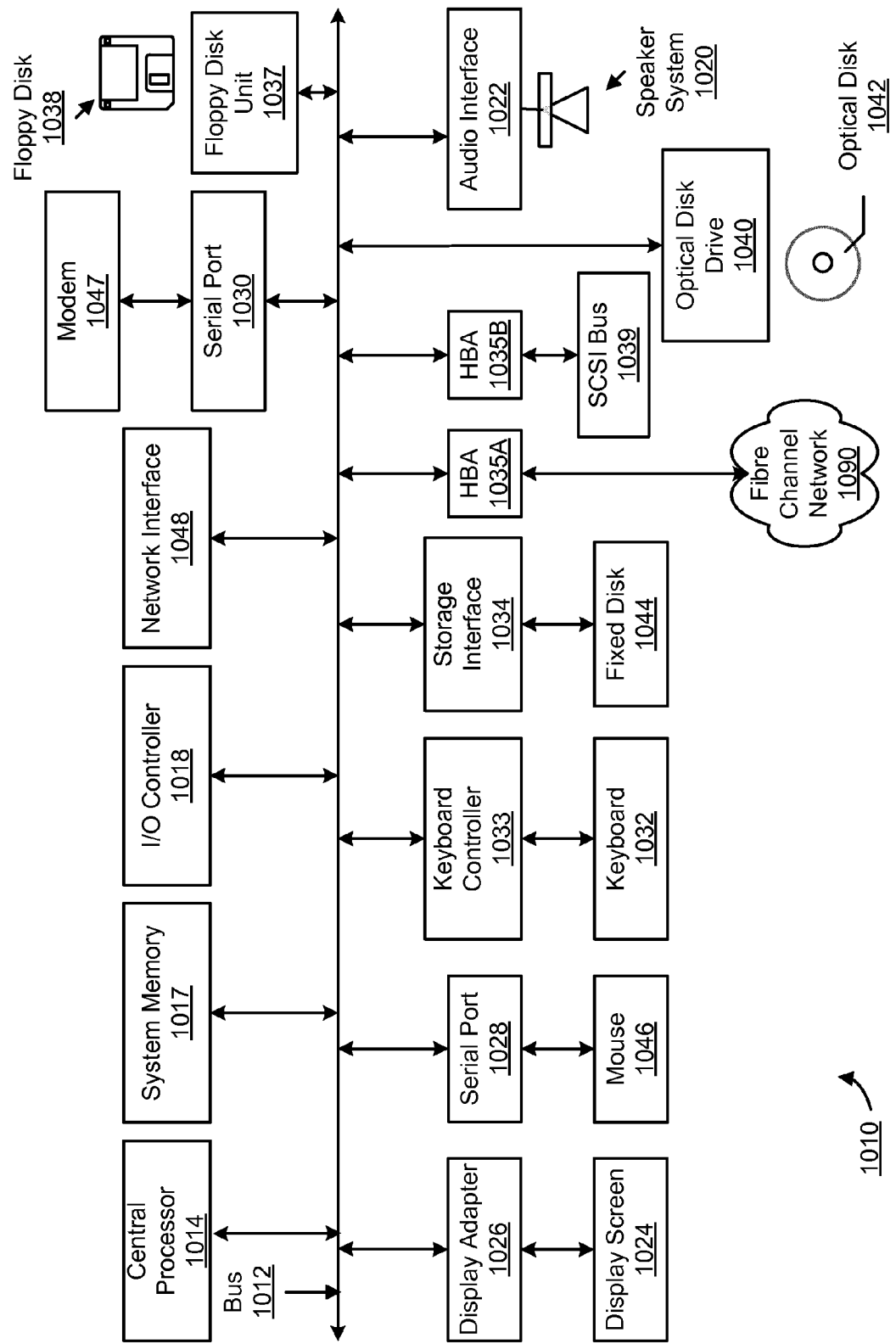
FIG. 10 is a simplified block diagram illustrating components of an example computer system suitable for implementing embodiments of the present disclosure, according to one embodiment.

FIG. 10 is a simplified block diagram that illustrates components of an example computer system 1010 that is suitable for implementing the present disclosure. Computer system 810 may be illustrative of various computer systems in the deduplication system 100, such as system(s) 110 and/or 160, among others. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1010 are generally stored on and accessed via a computer readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1010, can connect to a standard computer readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present disclosure. The devices and subsystems can be interconnected in different ways from that shown in FIG. 10. Code for performing operations (e.g., for automatically performing operations) on such applications based on their dependencies on other applications (such as described above with reference to the processes of FIG. 5-9), etc., to implement the present disclosure can be stored in computer-readable storage media such as one or more of system memory 1017, fixed disk 1044, optical disk 1042, or floppy disk 1038. Memory 1017 is also used for storing temporary variables or other intermediate information during the execution of instructions by the processor 1014. The operating system provided on computer system 810 may be MS-DOS®, MS-WINDOWS®, OS/2®, UNIX®, Linux®, or another known operating system.

Moreover, regarding the signals described herein, it will be understood that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 11:
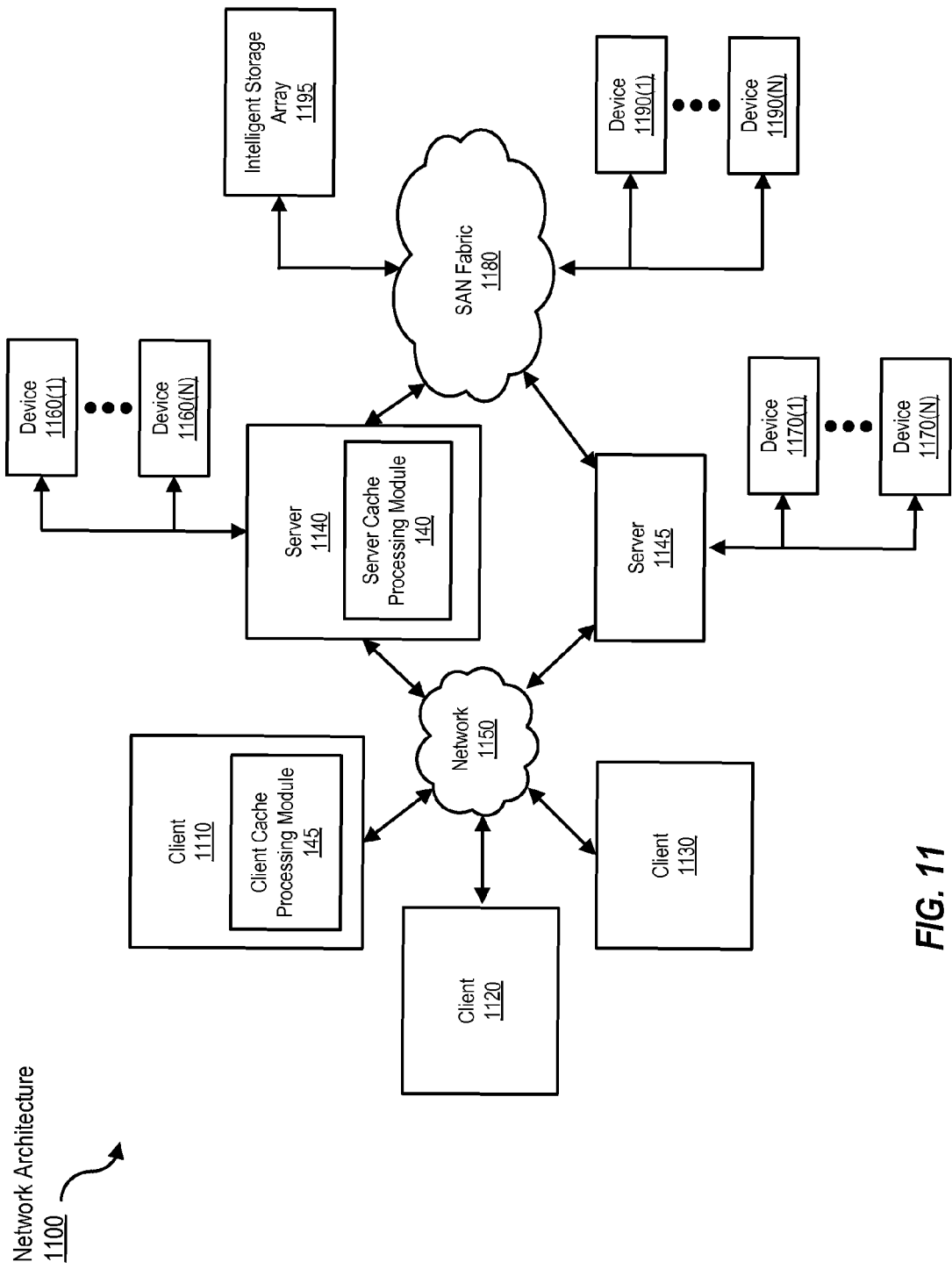
FIG. 11 is a simplified block diagram illustrating components of an example computer system suitable for implementing embodiments of the present disclosure, according to one embodiment.

FIG. 11 is a simplified block diagram illustrating components of an example computer system suitable for implementing embodiments of the present disclosure. FIG. 11 illustrates a network architecture 1100 in which client systems 1110, 1120 and 1130 and servers 1140, and 1145 can be coupled to a network 1150. Client systems 1110, 1120 and 1130 generally represent any type or form of computing device or system, such as client systems 110 in FIG. 1 or computer system 1010 in FIG. 10. In one example, client systems 1110, 1120, and/or 1130 can include a client cache processing module 145, as shown in FIG. 1.

Similarly, servers 1140 and 1145 generally represent computing devices or systems, such as application servers or database servers, configured to provide various database services and/or run certain software applications, such as deduplication server 110 in FIG. 1 or computer system 1010 in FIG. 10. Network 1150 generally represents any telecommunication or computer network including, for example, an intranet, a wide area network (WAN), a local area network (LAN), a personal area network (PAN), or the Internet. In one example, servers 1140 and/or 1145 can include a server cache processing module 140, as shown in FIG. 1.

As illustrated in FIG. 11, one or more storage devices 1160(1)-(N) can be directly attached to server 1140. Similarly, one or more storage devices 1170(1)-(N) can be directly attached to server 1145. Storage devices 1160(1)-(N) and storage devices 1170(1)-(N) generally represent any type or form of storage device or medium capable of storing data and/or other computer-readable instructions. In certain embodiments, storage devices 1160(1)-(N) and storage devices 1170(1)-(N) can represent network-attached storage (NAS) devices configured to communicate with servers 1140 and 1145 using various protocols, such as Network File System (NFS), Server Message Block (SMB), or Common Internet File System (CIFS).

Servers 1140 and 1145 can also be connected to a storage area network (SAN) fabric 1180. SAN fabric 1180 generally represents any type or form of computer network or architecture capable of facilitating communication between multiple storage devices. SAN fabric 1180 can facilitate communication between servers 1140 and 1145 and a plurality of storage devices 1190(1)-(N) and/or an intelligent storage array 1195. SAN fabric 1180 can also facilitate, via network 1150 and servers 1140 and 1145, communication between client systems 1110, 1120, and 1130 and storage devices 1190(1)-(N) and/or intelligent storage array 1195 in such a manner that devices 1190(1)-(N) and array 1195 appear as locally attached devices to client systems 1110, 1120, and 1130. As with storage devices 1160(1)-(N) and storage devices 1170(1)-(N), storage devices 1190(1)-(N) and intelligent storage array 1195 generally represent any type or form of storage device or medium capable of storing data and/or other computer-readable instructions.

In certain embodiments, and with reference to computer system 1010 of FIG. 10, a communication interface can be used to provide connectivity between each client system 1110, 1120 and 1130 and network 1150. Client systems 1110, 1120 and 1130 can be able to access information on server 1140 or 1145 using, for example, a web browser or other client software. Such software can allow client systems 1110, 1120 and 1130 to access data hosted by server 1140, server 1145, storage devices 1160(1)-(N), storage devices 1170(1)-(N), storage devices 1190(1)-(N), or intelligent storage array 1195. Although FIG. 11 depicts the use of a network (such as the Internet) for exchanging data, the embodiments described and/or illustrated herein are not limited to the Internet or any particular network-based environment.

In at least one embodiment, all or a portion of one or more of the embodiments disclosed herein can be encoded as a computer program and loaded onto and executed by server 1140, server 1145, storage devices 1160(1)-(N), storage devices 1170(1)-(N), storage devices 1190(1)-(N), intelligent storage array 1195, or any combination thereof. All or a portion of one or more of the embodiments disclosed herein can also be encoded as a computer program, stored in and run by server 1140 and server 1145, and distributed to client systems 1110, 1120 and 1130 over network 1150.

In some examples, all or a portion of the computing devices in FIGS. 1, 10, and 11 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In addition, one or more of the components described herein can transform data, physical devices, and/or representations of physical devices from one form to another. For example, a client cache processing module 145 in FIG. 1 can transform information received from a deduplication server into data stored in a client cache and/or in a central index.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   pre-populating a cache of a client ("client cache") with relevant fingerprints received from a server, wherein
      each of the relevant fingerprints corresponds to a data segment in a deduplicated data store on the server, and
      the pre-populating is performed in response to initiation of a backup process of the client,
      the pre-populating comprises
         retrieving the relevant fingerprints from the server based on, at least in part, a client name,
         storing the relevant fingerprints in a buffer list in the client cache, and
         sorting the relevant fingerprints in the buffer list based on a container ID value;
   determining whether one or more generated fingerprints are present in the client cache during a deduplication process, subsequent to the pre-populating, wherein
      the generated fingerprints are generated from client data during the backup process, and
      the deduplication process is part of the backup process; and
   in response to determining that at least one generated fingerprint of the one or more generated fingerprints is present in the client cache, transmitting the at least one generated fingerprint to the server, wherein
      each of the at least one generated fingerprints comprises information configured to be used during the deduplication process.

2. The method of claim 1, further comprising:
   determining whether the one or more generated fingerprints are present in a server cache, in response to a client cache miss.

3. The method of claim 2, further comprising:
recording metadata about whether the one or more generated fingerprints are present in the client cache and the server cache; and
sending the metadata to the server, wherein
the metadata is used to update a central index of fingerprints stored in the server cache.

4. The method of claim 1, wherein
the relevant fingerprints identify data segments included in one or more previous backup images of the client.

5. The method of claim 1, wherein the pre-populating further comprises:
identifying one or more groups of fingerprints in the sorted fingerprints, wherein
each of the one or more groups of fingerprints comprises one or more fingerprints that are associated with a same container ID.

6. The method of claim 1, wherein the pre-populating further comprises:
determining whether a storage container associated with a group of relevant fingerprints has good spatial locality, wherein
the group is associated with a same container ID that identifies the storage container.

7. The method of claim 6, wherein the determining whether the storage container has good spatial locality further comprises:
determining whether the storage container is associated with at least a threshold number of fingerprints.

8. The method of claim 6, wherein the determining whether the storage container has good spatial locality further comprises:
determining whether the storage container includes at least a threshold amount of data.

9. The method of claim 6, wherein the pre-populating further comprises:
adding the group of relevant fingerprints to the client cache, in response to a determination that the storage container has good spatial locality.

10. A system comprising:
a server; and
a client, communicatively coupled to the server, comprising:
a cache of a client ("client cache"), and
a client cache processing module configured to
pre-populate the client cache with relevant fingerprints received from the server, in response to initiation of a backup process of the client, wherein,
each of the relevant fingerprints corresponds to a data segment in a deduplicated data store on the server,
the client cache is pre-populated by retrieving the relevant fingerprints from the server based on, at least in part, a client name,
store the relevant fingerprints in a buffer list in the client cache,
sort the relevant fingerprints in the buffer list based on a container ID value,
determine whether one or more generated fingerprints are present in the client cache during a deduplication process, subsequent to pre-population of the client cache; and
in response to a determination that at least one generated fingerprint of the one or more generated fingerprints is present in the client cache, transmit the at least one generated fingerprint to the server, wherein
each of the at least one generated fingerprints comprises information configured to be used during the deduplication process.

11. The system of claim 10, wherein the server further comprises:
a server cache, and
a server cache processing module configured to
determine whether the one or more generated fingerprints are present in the server cache, in response to a request from the client cache processing module.

12. The system of claim 11, wherein the client cache processing module is further configured to
record metadata about whether the one or more generated fingerprints are present in the client cache and the server cache; and
send the metadata to the server, wherein
the metadata is used to update a central index of fingerprints stored in the server cache.

13. The system of claim 10, wherein
the relevant fingerprints identify data segments included in one or more previous backup images of the client.

14. The system of claim 10, wherein the client cache processing module is further configured to
identify one or more groups of fingerprints in the sorted fingerprints, wherein
each of the one or more groups of fingerprints comprises one or more fingerprints that are associated with a same container ID.

15. The system of claim 10, wherein the client cache processing module is further configured to
determine whether a storage container associated with a group of relevant fingerprints has good spatial locality, wherein
the group is associated with a container ID that identifies the storage container.

16. The system of claim 15, wherein the client cache processing module is further configured to
determine whether the storage container is associated with at least a threshold number of fingerprints.

17. The system of claim 15, wherein the client cache processing module is further configured to
determine whether the storage container includes at least a threshold amount of data.

18. The system of claim 15, wherein the client cache processing module is further configured to
add the group of relevant fingerprints to the client cache, in response to a determination that the storage container has good spatial locality.

19. A non-transitory computer readable storage medium configured to store program instructions that, when executed on a processor, are configured to cause the processor to perform a method comprising:
pre-populating a cache of a client ("client cache") with relevant fingerprints received from a server, wherein
each of the relevant fingerprints corresponds to a data segment in a deduplicated data store on the server,
the pre-populating is performed in response to initiation of a backup process of the client,
the pre-populating comprises
retrieving the relevant fingerprints from the server based on, at least in part, a client name,
storing the relevant fingerprints in a buffer list in the client cache, and sorting the relevant fingerprints in the buffer list based on a container ID value;
determining whether one or more generated fingerprints are present in the client cache during a deduplication process, subsequent to the pre-populating, wherein
the generated fingerprints are generated from client data during the backup process, and
the deduplication process is part of the backup process; and
in response to determining that at least one generated fingerprint of the one or more generated fingerprints is present in the client cache, transmitting the at least one generated fingerprint to the server, wherein
each of the at least one generated fingerprints comprises information configured to be used during the deduplication process.

20. The non-transitory computer readable storage medium of claim 19, wherein the method further comprises:
determining whether a storage container associated with a group of relevant fingerprints has good spatial locality, wherein
the group of relevant fingerprints comprises one or more fingerprints, and
the one or more fingerprints are associated with a same container ID that identifies the storage container.

* * * * *